United States Patent [19]

Kubo

[11] Patent Number: 4,943,914
[45] Date of Patent: Jul. 24, 1990

[54] STORAGE CONTROL SYSTEM IN WHICH REAL ADDRESS PORTION OF TLB IS ON SAME CHIP AS BAA

[75] Inventor: Kanji Kubo, Hadano, Japan
[73] Assignee: Hitachi, Ltd., Tokyo, Japan
[21] Appl. No.: 110,425
[22] Filed: Oct. 20, 1987

[30] Foreign Application Priority Data

Oct. 20, 1986 [JP] Japan ................................ 61-247414

[51] Int. Cl.⁵ .................... G06F 12/10; G06F 13/00
[52] U.S. Cl. ................................ 364/200; 364/232.8; 364/256.3
[58] Field of Search ... 364/200 MS File, 900 MS File

[56] References Cited

U.S. PATENT DOCUMENTS

| | | | |
|---|---|---|---|
| 4,317,168 | 2/1982 | Messina et al. | 364/200 |
| 4,332,010 | 5/1982 | Messina et al. | 364/200 |
| 4,400,770 | 8/1983 | Chan et al. | 364/200 |
| 4,695,950 | 9/1987 | Brandt et al. | 364/200 |

FOREIGN PATENT DOCUMENTS 0196244 10/1986 European Pat. Off. .

OTHER PUBLICATIONS

IEEE International Solid State Circuits Conf., vol. 25, Feb. 1982, pp. 180-181, 317, N.Y., U.S.; M. Odaka et al.: "Logic-In-Memory VLSI for Mainframe Computers".
"A RISC Microprocessor with Integral MMU and Cache Interface", written by Hansen et al., IEEE International Conference in Computer Design: VLSI in Computers, Port Chester, N.Y., Oct. 1986, pp. 145-148.
IBM Tech. Discl. Bulletin, vol. 27, No. 11, Apr. 1985, "Read-Select Capablity for Static Random-Access Memory", pp. 6640-6642.
WESCON 86/Conference Record, vol. 30, 18-20 Nov. 1986, pp. 38/5, 1-5, Session 3B15, Los Angeles, Calif. U.S.; A. Martin: "Design Strategies in High Performance Multiuser Systems".

*Primary Examiner*—Eddie P. Chan
*Attorney, Agent, or Firm*—Antonelli, Terry, Stout & Kraus

[57] ABSTRACT

The storage control system translates a logical address into a real address by using a translation lookaside buffer (TLB), and checks if a data to be referred to is present in a buffer storage by using a buffer address array (BAA). An integrated logic-in memory device for the storage control system includes a first memory for holding a real address part of the TLB, a second memory for holding a real address part of the BAA, and comparator means, for comparing outputs from the first and second memories, thus eliminating the transfer of a real address from the TLB to the BAA as in a discrete circuit form.

17 Claims, 6 Drawing Sheets

FIG. I PRIOR ART

STORAGE CONTROL SYSTEM IN WHICH REAL ADDRESS PORTION OF TLB IS ON SAME CHIP AS BAA

BACKGROUND OF THE INVENTION

The present invention relates to a storage control system for a computer adopting both a virtual storage system and a buffer storage system, and to a logic-in memory device used in the storage control system.

Recent large and middle scale computers generally include both a virtual storage system and a buffer storage system. With the virtual storage system, a programmer can perform coding without considering the size of a real storage in such a manner that he or she does not use a real address of a real storage but a logical address of a virtual storage. With the buffer storage system, a memory hierarchy is employed wherein a buffer storage of high speed and small capacity is provided between a central processing unit and a main storage so as to make the main storage of large capacity and low speed compatible with the system processing speed.

With the virtual storage system, it is necessary to translate a virtual address into a real address prior to reference to a main storage. Translating a virtual address into a real address is performed by referring to an address translation table in the main storage, the table having been prepared using a program. However, if the main storage is to be referred to each time the translation is performed, an overhead of address translation becomes large. In view of this, an address translation lookaside buffer (hereinafter called TLB) is provided which stores translation pairs of a virtual address and a real address obtained by once referring to the main memory. When the main memory is referred to, it is checked if a virtual address now concerned is present in the TLB or not. If present (this probability is very high because of a localized nature of a program), a corresponding real address can be obtained at high speed.

With the buffer storage system, the buffer storage copies a fraction of data stored in the main storage. In order to store such data correspondence, there is provided a buffer address array (hereinafter called BAA). When the central processing unit activates the system to refer to the main storage using a virtual address, it is checked if a corresponding real address translated by the TLB is present in the BAA. If present (this probability is very high because of the localized nature of a program), the necessary data is read from the buffer storage at high speed and sent to the central processing unit.

The reference to the TLB and BAA has been described as performed serially. However, it is necessary for a high speed processing to perform the reference in parallel. In this case, the BAA is referred to using a virtual address, more in particular, by a real address part (intra-page address) of the virtual address. The correspondence of data of the main storage and the buffer storage is expressed by using a so-called "block" generally constructed of 32 bytes or 64 bytes, so that the number of bits necessary for the reference to the BAA is 6 to 7 bits at most.

FIG. 1 is a block diagram showing an example of a buffer storage apparatus of the type in which both the TLB and BAA systems are referred to in parallel. Upon a memory request generated by the central processing unit, a virtual address is loaded in a register 1a. Entries of a TLB 2 are identified by the lower bits of the page address of the virtual address. In this example, the TLB 2 is constructed of k columns×2 rows, including a first row 2-1 and a second row 2-2. Namely, each of the first and second rows has k entries. Each entry of the rows 2-1 and 2-2 of the TLB 2 is constructed of a virtual or logical address part (L), a valid flag bit part (V) and a real address part (R). The contents of the L parts and V parts read from the rows of the TLB 2 are compared with the upper bits of the page address in the register 1a at the corresponding address comparators 4-1 and 4-2.

The entries of the BAA are identified by the upper bits of the intra-page address. In this example, a BAA 3 is constructed of l columns×2 rows, including a first row 3-1 and a second row 3-2. Each row has l entries. In the system wherein the TLB 2 and BAA 3 are referred to in parallel, the number l of columns of the BAA is determined on the basis of the block size of the buffer storage. Namely, assuming that the page size is 4 KB and the block size is 64 bytes, the number l of columns is 64. The number of rows is based on the buffer storage capacity. Each entry of the BAA 3 is constructed of a real address part (R) and a valid flag bit part (V). Real address comparators 6-1 and 6-2 compare the contents of the R parts of the BAA 3-1 and 3-2 with a real address (page address) read from the R part of the TLB 2-1 inputted to a selector 5 or a real address (page address) directly loaded from the central processing unit into the register 1a. The selector 5 selects the content of the register 1a when the central processing unit has directly loaded a real address in the register 1a, or selects the content of the TLB 2-1 when a virtual address has been loaded in the register 1a. Other real address comparators 7-1 and 7-2 compare real addresses read from the R parts of the TLB 2-2 with real addresses read from the R parts of the BAA 3-1 and 3-2. Each of the real address comparators 6-1, 6-2, 7-1 and 7-2 outputs "1" when two inputs become coincident.

The comparison results by the real address comparators 6-1, 6-2, 7-1 and 7-2 are inputted to an encoder 8 and selected based on the results of the virtual address comparators 4-1 and 4-2 and thereafter, the encoded output (one bit in this case) is stored in a register 9 at its upper portion and the intra-page address in the register 1a at its lower portion. Thus, a buffer storage address corresponding to a virtual address or a real address loaded in the register 1a can be obtained in the register 9. Using the address in the register 9, the buffer storage is accessed and the read-out data is transferred to the central processing unit.

The TLB 2 and BAA 3 must operate at high speed and also must have a certain capacity. Accordingly, they are commonly constructed of bipolar memories. A conventional bipolar memory used for such application is shown in FIG. 2.

Referring to FIG. 2, address signals applied to input pins A0 to A2 and A3 to A5 are decoded by an X address decoder 10 and a Y address decoder 14, respectively, and supplied to drivers 11 and 13 which in turn activate a memory cell 12. In this example, the memory cell 12 is constructed of 64 bits of 8 bits×8 bits. One bit selected from the memory cell 12 is supplied to an output circuit 16 via a sense amplifier 15 to thereby output read-out data at an output pin DO (data out). While a WE (write enable) signal is valid, a write mode is activated. In the write mode, data at an input pin DI (data in) of a gate 17 is supplied to AND gates 18 and 19 where it is subjected to an AND operation with a WE signal so that a write "1" or "0" signal is made valid at the output of the AND gate 18 or 19. The write "1" or "0" signal is written via a driver 13 into the memory cell 12 at an address designated by address signals A0 to A5.

The bipolar memory of this type is used as the TLB or BAA by arranging it in matrix configuration realizing a desired word length and bit width.

Large scaled and high speed computers have recently been realized due to the development and improvement of super high density LSIs. This tendency is considered to be enhanced further in the future. While most of logic units such as arithmetic units are implemented in the form of LSIs with high operating speed, the logic part containing a bipolar memory is mostly occupied by gates for distribution of address to bipolar memory cells and for selection of read-out data from bipolar memory cells, thereby resulting in difficulty in implementing such units in the form of LSIs and of utilizing the advantageous features of LSIs. Therefore, there is a high possibility that such a difficulty results in a critical path in the unit which limits machine cycles of a computer. In addition, there is a tendency that the capacity of a main storage also increases so that the capacity of a buffer storage is required to be increased, i.e., the capacity of a BAA is required to be increased. In the meantime, it is now possible to realize a high speed 4K bit memory due to the advance of high integration of a bipolar memory. However, since the available number of columns of a BAA in the TLB and BAA parallel reference system is 6 to 7 bits at most as described before, it becomes necessary to increase the number of bits for high integration of a bipolar memory. However, if a BAA of large capacity is implemented using a bipolar memory having the configuration as discussed with FIG. 2, the number of package pins of the bipolar memory increases considerably so that it is hard to easily realize it.

For example, if a 4K bit memory is constructed of 64 words, it is possible to use 64 bits. However, in this case, the number of necessary pins becomes 140 for both the address and data lines. Thus, the package size of a bipolar memory is restricted by the number of input/output pins.

The Japanese Patent Publication No. JP-B-57-57784 discloses and apparatus which uses a TLB and a BAA constructed of a memory chip with a comparator included therein. The above described restriction is intended to be solved by including in a memory chip the portion encircled by a broken line in FIG. 1, for example. U.S. Pat. No. 4,332,010 also discloses a memory chip with a comparator included therein.

According to the JP-B-57-57784, a real address read from a TLB is temporarily outputted from the memory chip having the TLB and inputted to a memory chip having a BAA to be compared with a real address read by the BAA. Therefore, there is a problem that the number of pins necessary for the input/output with respect to the TLB and BAA, and a propagation delay are increased.

SUMMARY OF THE INVENTION

It is an object of the present invention to provide an integrated logic-in memory device capable of decreasing the propagation delay and the number of input/output pins for a package.

The integrated logic-in memory device according to the present invention comprises, in an integrated circuit form, a first memory for holding a real address part of a TLB, a second memory for holding a real address part of a BAA, and at least a comparator for comparing an output from the first memory with an output from the second memory.

In the integrated logic-in memory device according to the present invention, a real address is not transferred from a TLB chip to a BAA chip so that it is possible to decrease the number of pins and a propagation delay. Although the TLB and the BAA each perform a different function, they operate in close relationship to each other so that they may be implemented in a single chip. However, this may not be practical in some cases since the resultant chip becomes large. In view of this, according to the present invention, the TLB is divided such that the portion holding a real address part is implemented in a single chip together with the BAA.

DESCRIPTION OF THE PREFERRED EMBODIMENTS

Figure 1:
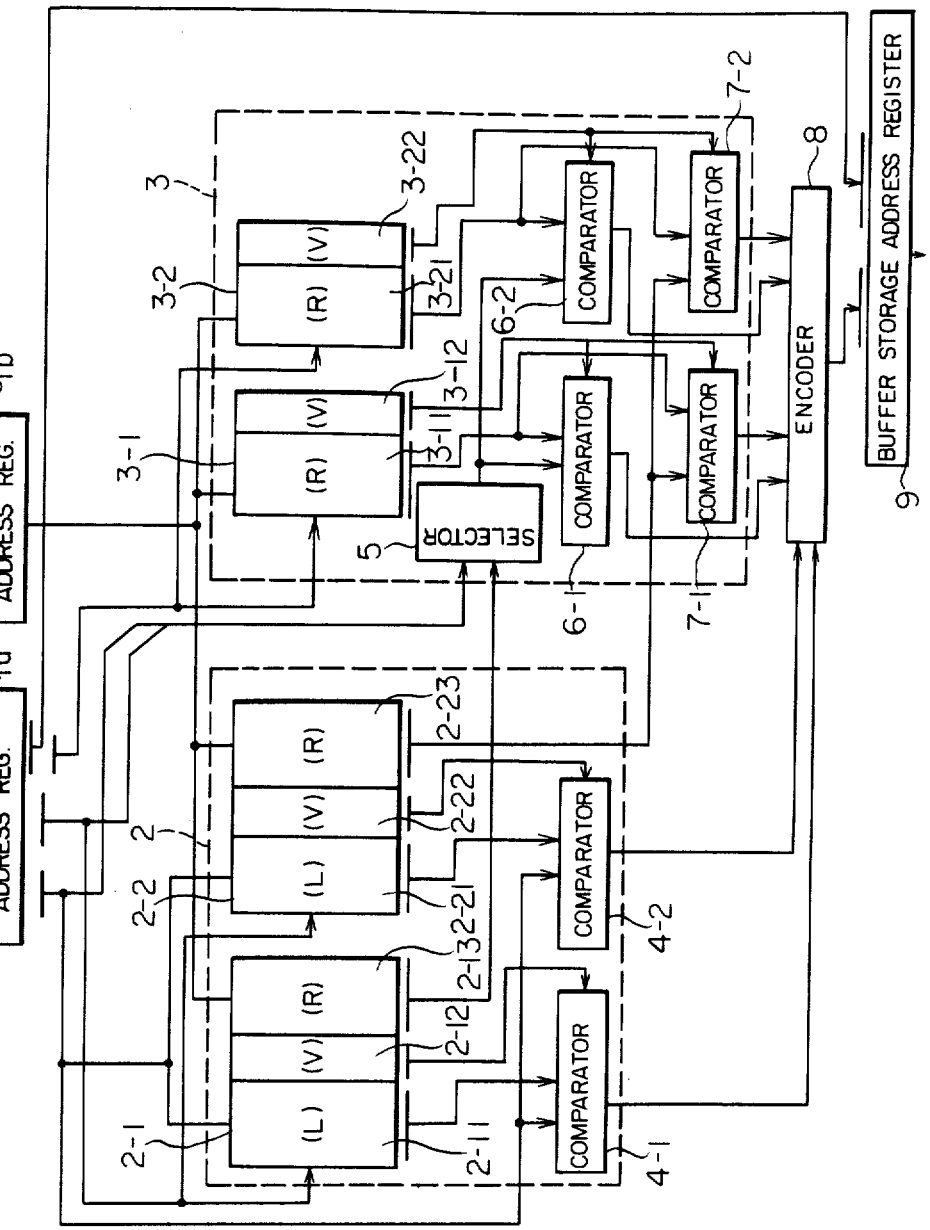
FIG. 1 is a block diagram showing a conventional device.
Figure 2:
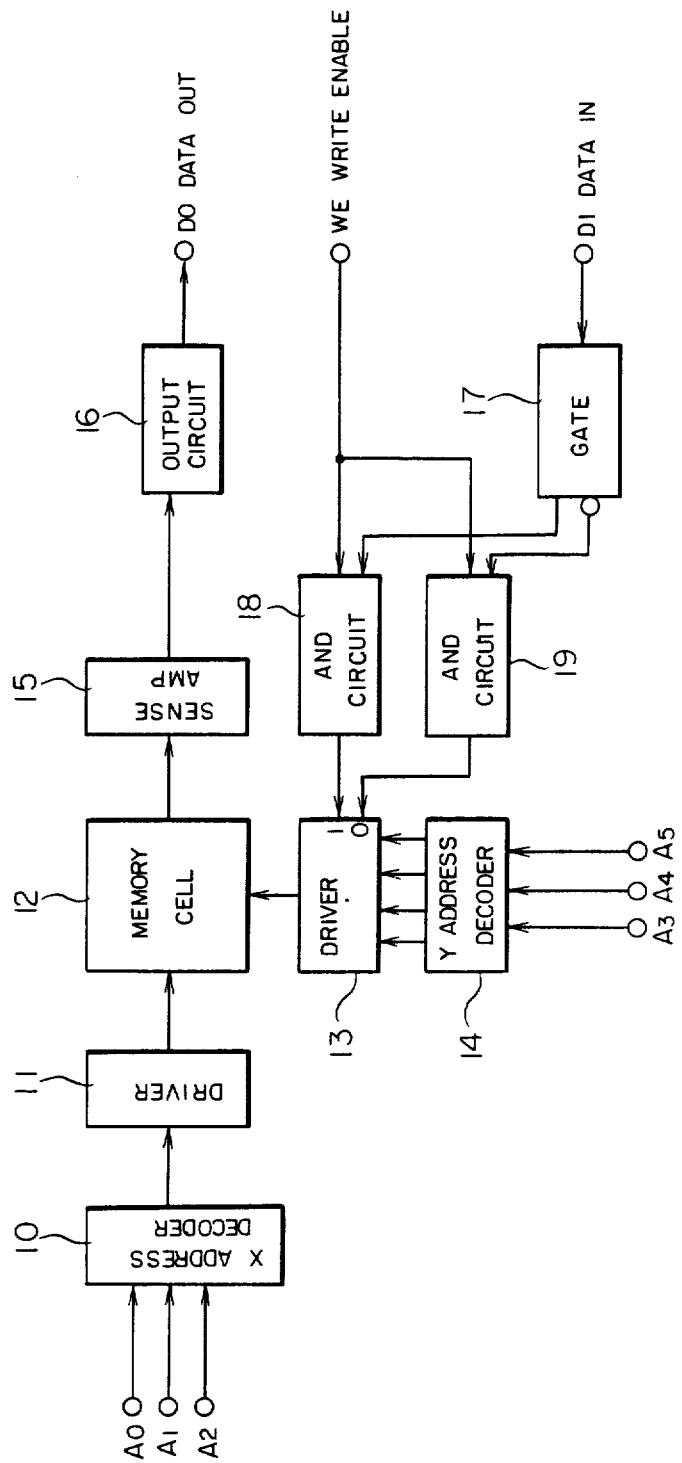
FIG. 2 is a block diagram showing a general configuration of a bipolar memory.
Figure 3:
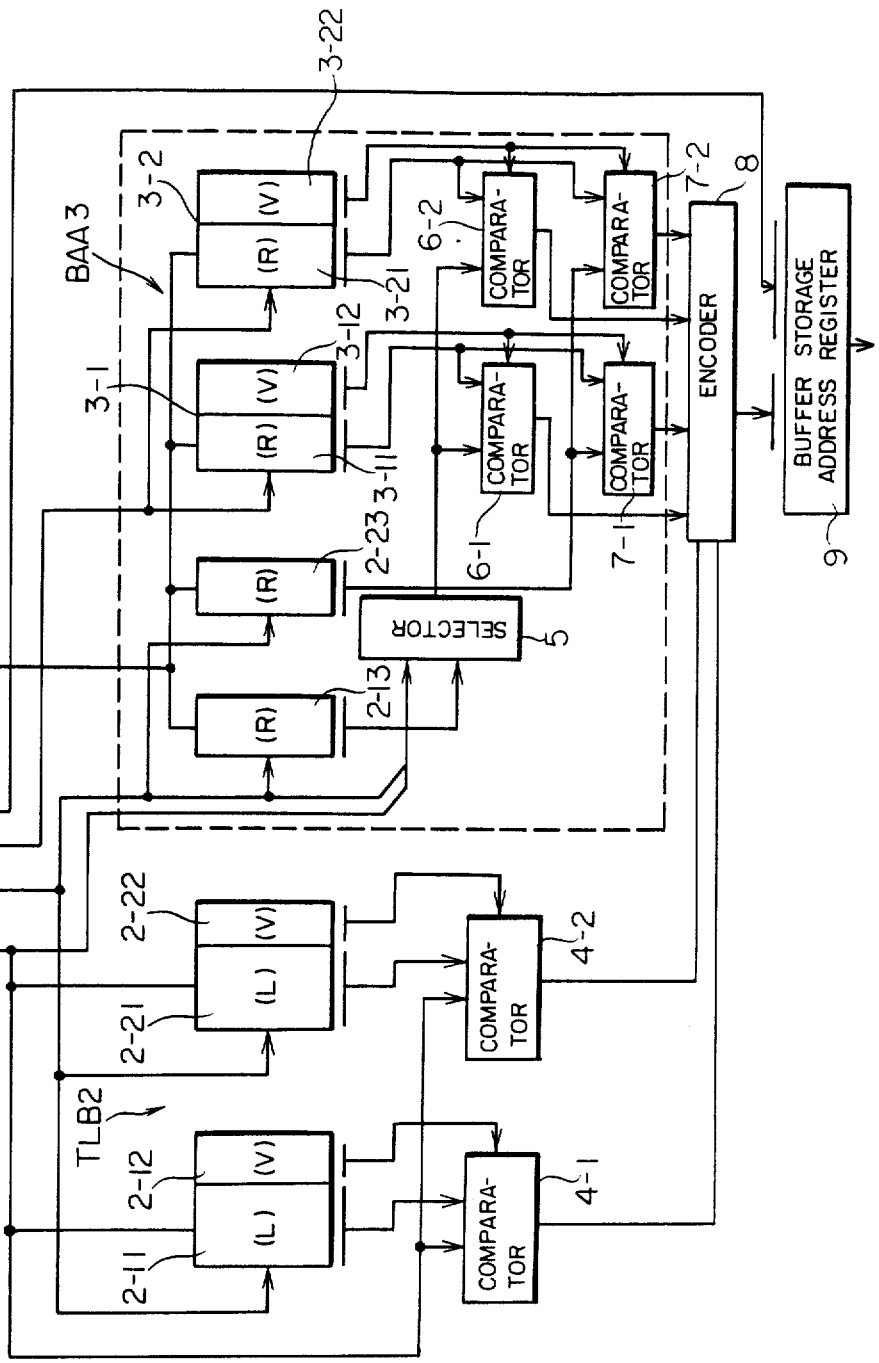
FIG. 3 is a block diagram illustrating an embodiment of the present invention.

FIG. 3 is a block diagram illustrating an embodiment of the present invention. The portion encircled by a broken line in FIG. 3 is a memory chip constituting a gist of the present invention. Similar constituent elements to those in FIG. 1 are represented by using identical numbers. The memory chip encircled by a broken line includes rows 3-1 and 3-2 constituting a BAA 3, comparators 6-1, 6-2, 7-1 and 7-2, R parts 2-13 and 2-23 of the rows which in part constitute a TLB 2, and a selector 5. Rows 3-1 and 3-2 of the BAA are connected to a common input for a column address, i.e., to upper bits of the intra-page address in an address register 1a. R parts 2-13 and 2-23 of the TLB are connected to a common input for a column address different from that of the BAA, i.e., to lower bits of the page address in the address register 1a. Rows 3-1 and 3-2 of the BAA and R parts 2-13 and 2-23 of the TLB are connected to a common data-in signal input, i.e., to a register 1b for address registration. With this construction, it is possible to compare a real address read by the TLB with a real address read by the BAA without fetching the former real address from the outside of the memory chip. A V part of the BAA is used as an enable signal for the comparators. L and V parts of the TLB and comparators 4-1 and 4-2 may be implemented as another memory chip with the comparators included therein.

Figure 4:
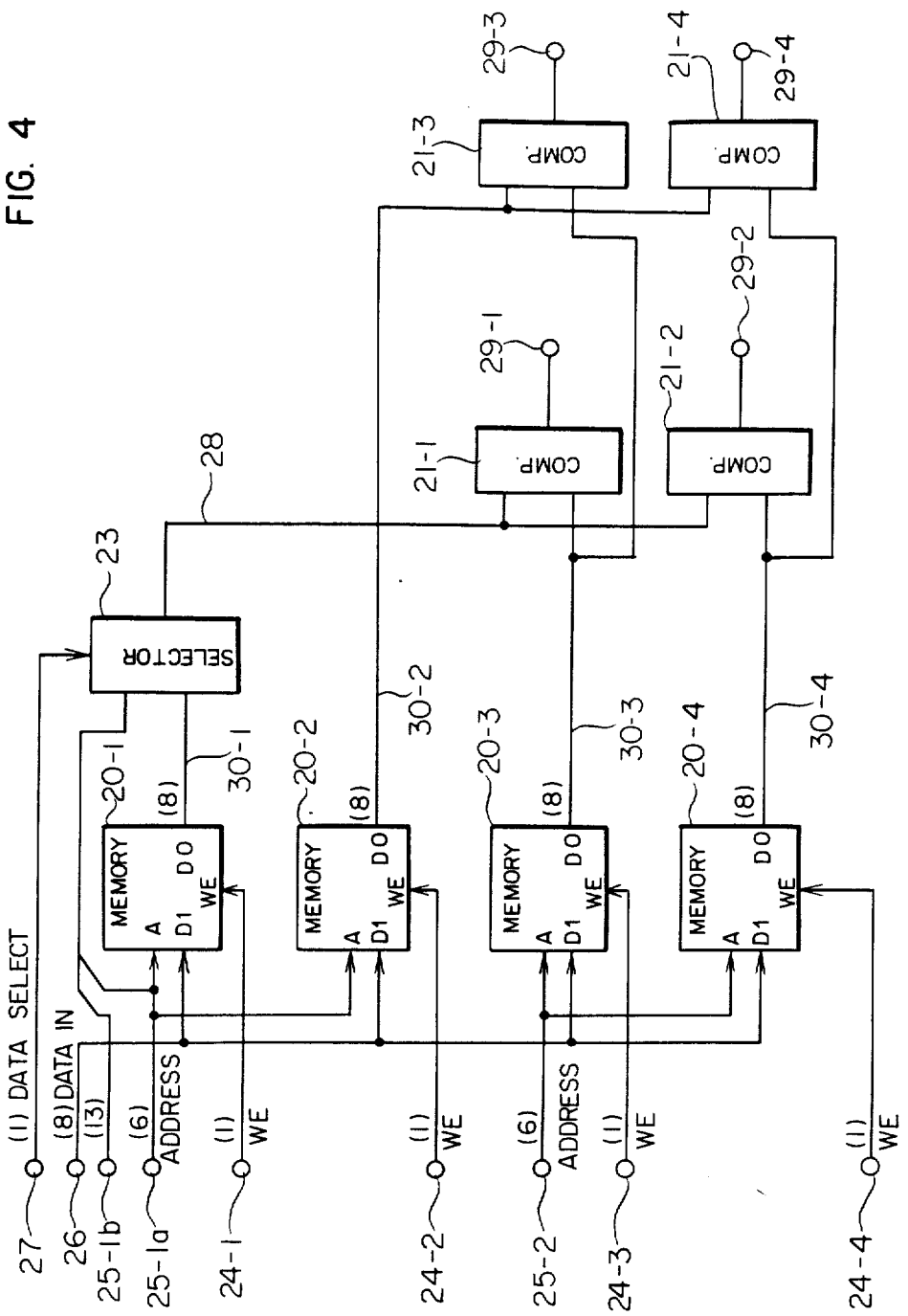
FIG. 4 is a block diagram showing a particular example of the logic-in memory device shown in FIG. 3.

FIG. 4 is a particular circuit diagram of the memory chip encircled by a broken line in FIG. 3. In the Figure, numbers in parentheses represent the number of the signals which changes as the degree of integration changes, and the present invention is not intended to be limited to such numbers. Reference numbers 20-1 and 20-2 represent a first memory constructed of two rows in this embodiment, 20-3 and 20-4 represent a second memory constructed of two rows in this embodiment. The internal structure of the memory parts 20-1 to 20-4 may be similar to that of a conventional one. The memory parts 20-1 to 20-4 are supplied with corresponding write enable (WE) signals 24-1 and a common data-in signal 26. The memory parts 20-1 and 20-2 are supplied with a common first address signal 25-1a, and the memory parts 20-3 and 20-4 are supplied with a common second address signal 25-2. Accordingly, data-out signals 30-1 to 30-4 are outputted from the memory parts. A selector 23 selects the data-out signal 30-1 or one of the address signals 25-1a and 25-1b based on a data select signal 27 to thereby deliver it as an output signal 28. Comparators 21-1 to 21-4 compare the data-out signals 30-3 and 30-4 read from the memory parts 20-3 and 20-4 with the output signal 28 from the selector 23 and the output signal 30-2 from the memory part 30-2. The comparators 20-3 to 20-4 each output a comparison output "1" signal 29-1 to 29-4 when two inputs to each comparator are not coincident.

The memory parts 20-1 to 20-4 are substantially similar to those conventional ones. However, according to the aspect of the present invention, the memory parts are divided into the first and second memories, and the outputs of the first and second memories are compared with each other. The operation at each mode will be described:

(a) Write Mode

When one of the write enable signals 24-1 to 24-4 and the address signal 25-1a or 25-2 are made valid, the contents of the data-in signal 26 are written to the memory part designated by the write enable signal at an address designated by the address signal 25-1a or 25-2. The memory parts 20-1 and 20-2 correspond to the first and second rows of the real address parts of the TLB, while the memory parts 20-3 and 20-4 correspond to the first and second rows of the BAA. A new address is registered in the TLB or BAA after a specific row has been selected in accordance with a particular algorithm. Since the registration of an address into the TLB and the BAA is not performed at the same time in an ordinary case, a data-in signal can be supplied in a similar manner for all the memory parts so that the number of package pins can be advantageously decreased.

(b) Comparison Mode

The address signals 25-1a and 25-2 are made valid to activate the memory parts 20-1 to 20-4 and output the data-out signals. The data-out signal 30-1 is selected based on the data select signal 27 and outputted as the output signal 28. The output signal 28 is supplied to the comparators 21-1 and 21-2, while the data-out signals 30-2 to 30-4 are supplied to the comparators 21-1 to 21-4. The comparator 21-1 compares the first row of the real address part of the TLB with the first row of the real address part of the BAA, the comparator 21-2 compares the first row of the real address part of the TLB with the second row of the real address part of the BAA, the comparator 21-3 compares the second row of the real address part of the TLB with the first row of the real address part of the BAA, and the comparator 21-4 compares the second row of the real address part of the TLB with the second row of the real address part of the BAA. The comparison results are outputted as the outputs 29-1 to 29-4. The comparators 21-1 to 21-4 each make its outputs 29-1 to 29-4 "1" when two input bits to each comparator are not coincident, by means of an exclusive OR operation. Obviously the comparators 21-1 to 21-4 may be constructed such that the outputs 29-1 to 29-4 may be made "1" when two input bits become coincident. The selector 23 selects the real address part of the TLB when the address referring to the BAA is a virtual address, and selects the address itself referring to the BAA when it is a real address.

In the above embodiment, the signals 24-1 to 24-4, 25-1a and 25-1b, 25-2, 26, 27, 29-1 to 29-4 are inputted from or outputted to corresponding input or output pins provided on the package.

Figure 5:
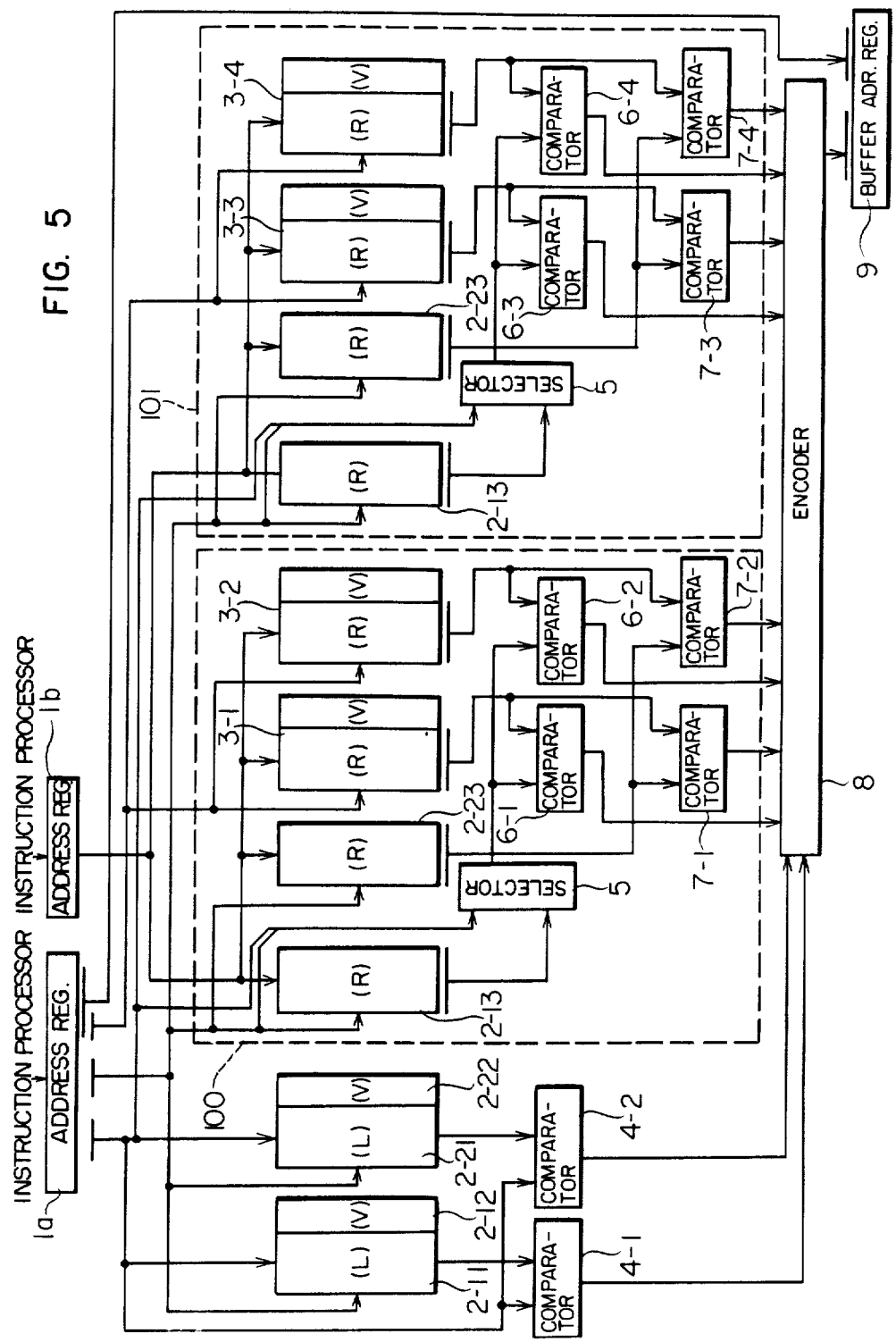
FIGS. 5 and 6 are block diagrams of other embodiments of the present invention.

FIG. 5 is a block diagram showing another embodiment of the present invention, which uses two memory chips in contrast with one memory chip in the embodiment of FIG. 3. The number of rows used in the embodiment of FIG. 3 is 2. This embodiment shown in FIG. 5 is effective in the case where the number of rows are large so that the FIG. 3 embodiment cannot accommodate such rows. Memory chips 100 and 101 have quite the same structure as that shown in FIG. 3. R parts 2-13 and 2-13' in the memory chips 100 and 101 are the first row of the TLB and stores the same real address. R parts 2-23 and 2-23' in the memory chips 100 and 101 are the second row of the TLB and stores the same real address. Reference numbers 3-1 and 3-2 in the memory chip 100 represent first and second rows 1 and 2 of the BAA, respectively, while reference numbers 3-3 and 3-4 in the memory chip 101 represent third and fourth rows of the BAA, respectively.

As above, by increasing the number of memory chips as the number of rows of the BAA increases, and by including the R parts of the same row of the TLB in each memory chip, it is possible to compare a real address read from the TLB with the R part of the BAA without transferring the real address between the TLB and the BAA, similar to the embodiment shown in FIG. 3. Interconnection between V parts and comparators is omitted in FIG. 5.

Figure 6:
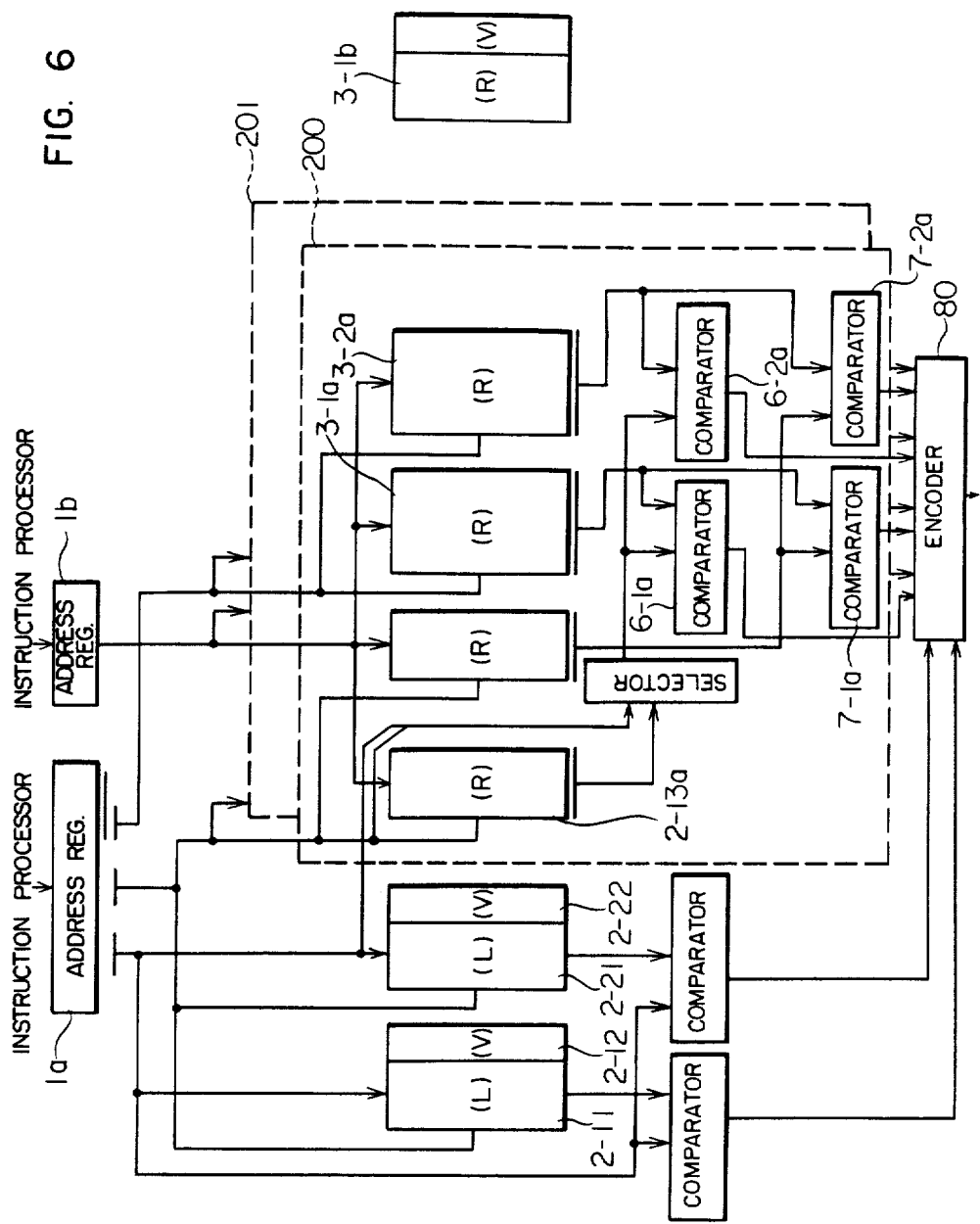

FIG. 6 shows another embodiment of this invention, wherein two memory chips 200 and 201 are used similar to the embodiment of FIG. 5. This embodiment is useful in the case where each memory chip has insufficient bit capacity. For example, if one memory part shown as having 8-bit length in FIG. 4 has 4 bit length or a real address of 16 bits is required to be loaded, the upper and lower halves of an address is divisionally loaded in the memory chips 200 and 201. Each row of the BAA has a V part, whereas a row 3-1a serving to handle the upper bits of the same row has not a V part and row 3-1b (in the memory chip 201) serving to handle the lower bits has a V part. An encoder 80 judges the coincidence of a row when the upper and lower bits both become coincident.

In the above embodiments, the R part of the TLB has been described as not having the V part. However, the V part may be added to the R part such that the V part set at "1" is compared with a corresponding V part of the BAA at the comparator. Alternatively, if the V part is not added to the R part of the TLB, the comparator may be constructed such that the bit corresponding to the V part of the BAA is fixed to a high level.

Further, although the L and V parts of the TLB have been disposed outside of the memory chip in the above embodiments, various discriminators, table origins (STO) or storage protection keys may be stored in the memory chip.

Furthermore, as a column address of the BAA, not only the upper bits of the intra-page address but also the lower address of the page address may be used. In such a case, the lower bits of the TLB column address in the memory chip and the upper bits of the BAA column address are duplicated so that ones of these bits may be shared in use.

According to the present invention, the memory parts for the real addresses of the TLB and BAA and the comparator section for comparing the outputs of the memory parts are mounted on the same memory package. Therefore, propagation delay and the number of pins are effectively decreased.

In the above embodiments, the register 1a for loading an address accessing to the TLB and BAA and the register 1b for loading a real address to be registered in the TLB and BAA are separately constructed. However, the registers 1a and 1b may be combined as a common register.

I claim:

1. A storage control system, comprising:
   an address translation buffer storing translation pairs of a virtual address and a real address for translating a virtual address into a real address;
   a buffer address array storing a real address of data stored in a buffer storage;
   register means holding address for accessing the address translation buffer and the buffer address array and for loading an address to be registered into the address translation buffer and the buffer address array;
   said address translation buffer being divided into a first part storing virtual addresses and a second part forming a first memory for holding real addresses corresponding to virtual addresses stored in said first part, and said buffer address array forming a second memory for holding said real addresses of data stored in said buffer storage; and
   comparator means connected to said first and second memories for comparing an output from said first memory with an output from said second memory;
   said first memory, second memory and comparator means being formed together in an integrated circuit chip, separate from said first part of said address translation buffer.

2. A storage control system according to claim 1 further comprising first address signal input pins, second address signal input pins and data-in signal input pins, wherein said first and second memories are connected respectively to said first and second address signal input pins, and connected in common to said data-in signal input pins.

3. A storage control system according to claim 2, wherein
   said first memory is divided into m rows which are connected in common to said first address signal input pins and said data-in signal input pins;
   said second memory is divided into n rows which are connected in common to said second address signal input pins and data-in signal input pins;
   said comparator means includes m×n comparators;
   each of said rows of said second memory having an output connected to m comparators; and
   each of said rows of said first memory having an output connected to n comparators each connected to a respective one of said rows of said second memory.

4. A storage control system, comprising:
   an address translation buffer storing translation pairs of a virtual address and a real address for translating a virtual address into a real address;
   a buffer address array storing a real address of data stored in a buffer storage;
   register means holding a virtual address having a first address portion for accessing the address translation buffer and the buffer address array and a second address portion;
   said address translation buffer being divided into a first part storing virtual addresses and a second part forming a first memory for holding real addresses, and said buffer address array forming a second memory for holding said real addresses of data stored in said buffer storage; and
   a plurality of comparators forming first comparator means connected to said first and second memories for comparing an output from said first memory with an output from said second memory and second comparator means connected to said register means and said first part of said address translation buffer for comparing a second address portion from said register means to a virtual address read out of said first part of said address translation buffer; and wherein
   said first memory, said first comparator means and said second memory are formed in an integrated circuit chip, while said first part of said address translation buffer and said second comparator means are provided outside said integrated circuit chip.

5. A storage control system according to claim 4, further including first address signal input pins, second address signal input pins and data-in signal input pins, wherein said first and second memories are connected respectively to said first and second address signal input pins, and connected in common to said data-in signal input pins, and wherein said first and second address signal input pins and said data-in signal input pins are connected in common to said register means.

6. A storage control system according to claim 5, wherein
   said first memory is divided into m rows which are connected in common to said first address signal input pins and data-in signal input pins;
   said second memory is divided into n rows which are connected in common to said second address signal input pins and data-in signal input pins;
   said comparator means includes m×x comparators;
   each of said rows of said second memory has its output connected to m comparators; and
   each of said rows of said first memory has its output connected to n comparators each connected to a different one of said rows of said second memory.

7. A storage control system according to claim 5, including a plurality of memory devices, each memory device including a first memory, a second memory and a first comparator means formed on a respective integrated circuit chip.

8. A storage control system according to claim 7 comprising further register means for storing addresses to be stored in said first and second memory means formed on said respective integrated circuit chips, wherein the data-in signal input pins belonging to one memory device are connected to one field of said further register means, the data-in signal input pins belonging to another memory device are connected to another field of said further register means.

9. A storage control system for performing address translation and obtaining data by using a translated address, comprising:
   register means for receiving a logical address provided as a request address for a main storage access, the request address including both a translatable field and a nontranslatable field;

first memory means for storing an address field representing a main storage address corresponding to data in a buffer memory and accessed in response to a first memory address obtained from the register means including a part of the non-translatable field;

second memory means for storing main storage addresses obtained by address translation of respective request addresses and accessible in response to a second memory address obtained from the register means including a part of the translatable field;

third memory means for storing another part of said translatable field included in the plurality of request addresses and accessible in response to a third memory address obtained from the register means including said part of said translatable field;

accessing means for accessing in parallel addresses stored in the first and second memory means in accordance with the request address in the register means; and comparator means for comparing an output of the first memory means with an output of the second memory means to detect if required data is stored in the buffer memory;

the first memory means, the second memory means and the comparator means being formed together in an integrated circuit chip, separate from said third memory means.

10. A storage control system according to claim 9 wherein the first memory means is divided into a plurality of rows, the second memory means is divided into a plurality of rows, the comparator means includes means for comparing each output of rows of the first memory means with each output of rows of the second memory means.

11. A storage control system according to claim 9 comprising bus means connected to the first and second memory means for transmitting data to be supplied to either the first memory means or the second memory means.

12. A storage control system according to claim 11 comprising a plurality of data input pins connected the data bus for receiving external data which is obtained by an address translation.

13. A storage control system according to claim 11 comprising address signal input pins for receiving the second memory address, selector means placed in a data transferring path between the second memory means and the comparator means for selecting address data output from the second memory means and a signal received via the address signal input pins.

14. A storage control system for performing address translation and obtaining data by using a translated address, comprising:

register means for receiving a logical address provided as a request address for a main storage access, the request address including both a first field and a second field;

first memory means for storing an address field representing a main storage address corresponding to data in a buffer memory and accessible in response to a first memory address obtained from the register means including a part of the second field;

second memory means for storing main storage addresses obtained by address translations of respective request addresses and accessible in response to a second memory address obtained from the register means including a part of the first field;

third memory means for storing another part of said first field included in the plurality of request addresses and accessible in response to a third memory address obtained from the register means including said part of said first field;

accessing means for accessing in parallel addresses stored in the first, second and third memory means in accordance with the request address in the register means;

comparator means for comparing an output of the first memory means with an output of the second memory means to detect if required data is stored in the buffer memory;

first line means for data communication between the first memory means and the comparator means; and second line means for data communication between the second memory means and the comparator means; and the first memory means, the second memory means, the comparator means, the first line means and the second line means being formed together in an integrated circuit chip, separate from said third memory means.

15. A storage control system according to claim 14 wherein the first memory means is divided into a plurality of rows, the second memory means is divided into a plurality of rows, the comparator means includes means for comparing each output of rows of the first memory means with each output of rows of the second memory means.

16. A storage control system according to claim 15 comprising bus means connected to the first and second memory means for transferring data to be supplied to either the first memory means or the second memory means.

17. A storage control system according to claim 15 comprising address signal input pins for receiving the second memory address, selector means placed in the second line means for selecting address data output from the second memory means and a signal received via the address signal input pins.

* * * * *